Dec. 8, 1942.  N. L. HAGAN  2,304,086
CARRIER UNLOADER
Filed Oct. 16, 1941  2 Sheets-Sheet 1
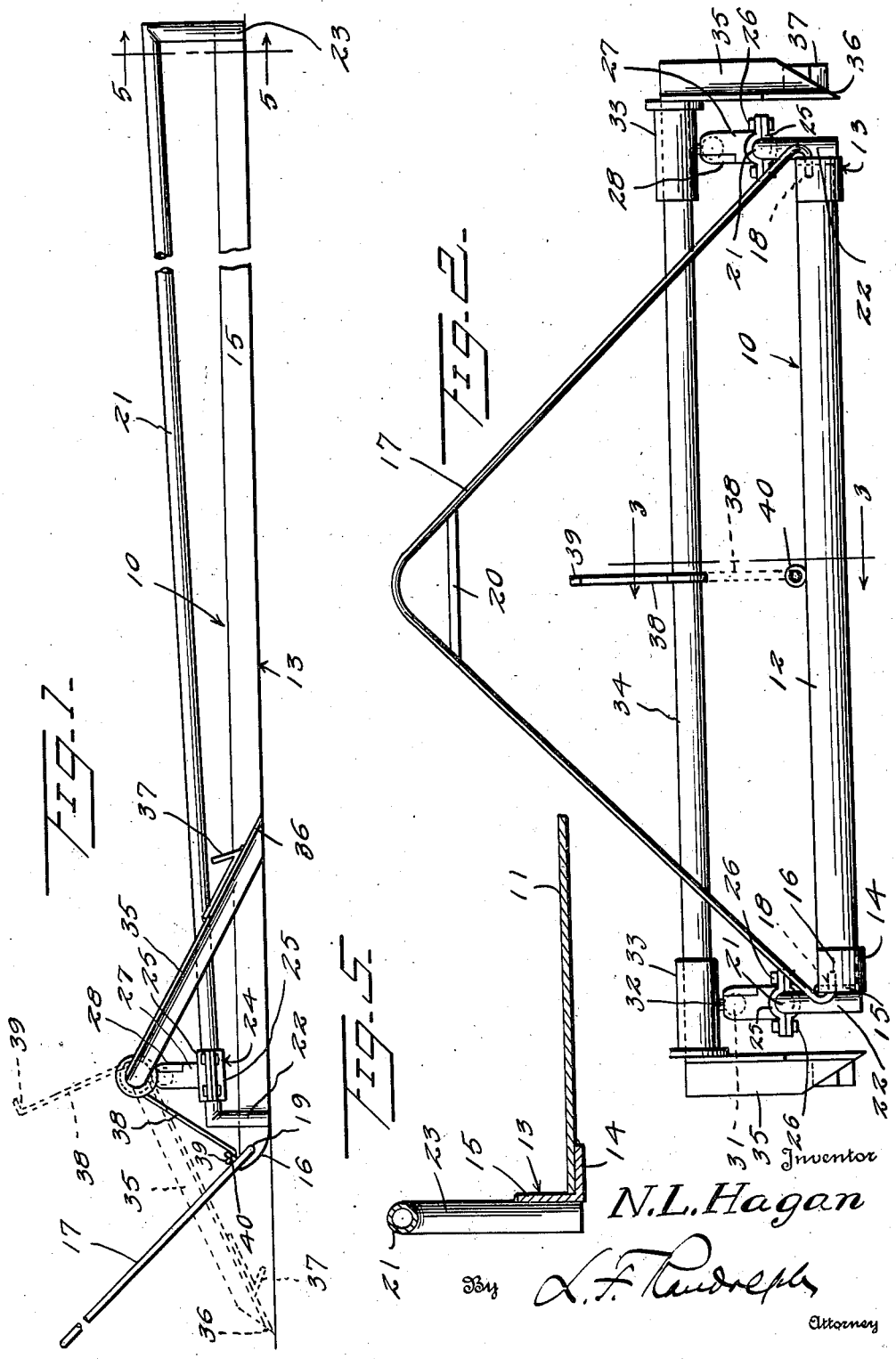
Inventor
N. L. Hagan
By L. F. Rudolph
Attorney Dec. 8, 1942.    N. L. HAGAN    2,304,086
CARRIER UNLOADER
Filed Oct. 16, 1941    2 Sheets-Sheet 2
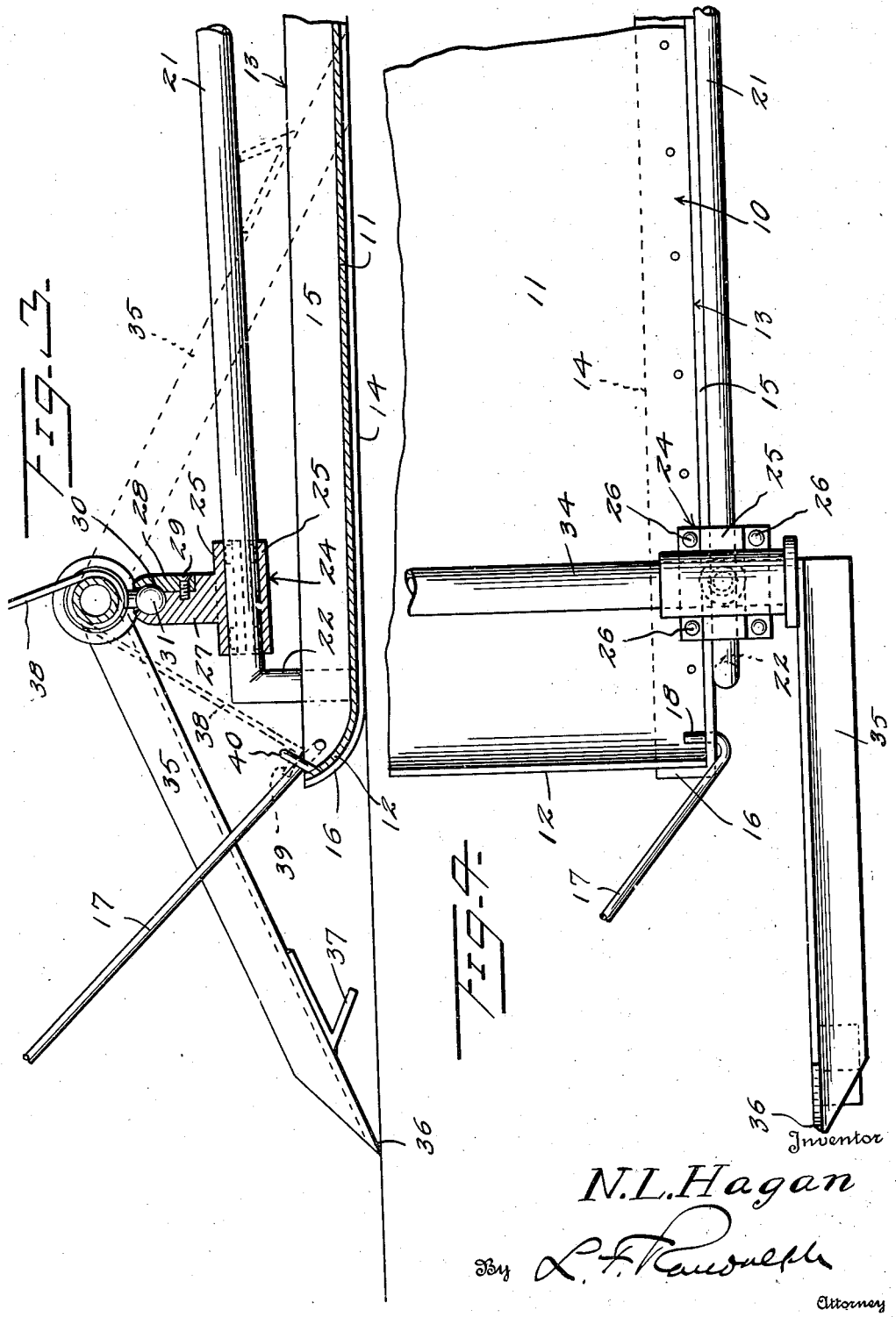
Inventor
N. L. Hagan
By L. F. Randolph
Attorney Patented Dec. 8, 1942

2,304,086

UNITED STATES PATENT OFFICE 2,304,086

CARRIER UNLOADER

Noah L. Hagan, Pine Bluff, Ark.

Application October 16, 1941, Serial No. 415,284

7 Claims. (Cl. 214—82)

This invention relates to an unloader for carriers and more particularly to a device that is adapted to be slidably mounted relatively to a carrier and having means for anchoring the device to the surface over which the carrier is moving so that the carrier will be moved relatively to the device to cause the device to engage and push a load, mounted on the carrier, off of the rear end thereof.

More particularly, it is an aim of the invention to provide a drag or sled which is adapted to be attached to the rear end of a pickup hay press or baler for receiving the baled hay and for conveying the baled hay to a point where it is desired to unload the bale.

A further aim of the invention is to provide a member which is disposed transversely of the sled or drag and mounted to slide longitudinally thereof and which is turnably mounted in its supports so that anchoring spikes, carried thereby, can be moved in position to engage the earth for anchoring said member so that the carrier can be drawn relatively thereto so that said member will then push the load off of the sled or drag.

Other objects and advantages of the invention will hereinafter become apparent from the following description of the drawings, which illustrate a preferred embodiment of the invention, and wherein:

Figure 1 is a side elevational view showing a drag or sled equipped with the unloader and showing the unloader in an inoperative position, and in an operative position, in dotted lines, Figure 2 is a front elevational view of the same showing the unloader in an operative position, Figure 3 is an enlarged longitudinal vertical sectional view taken substantially along the plane of the line 3—3 of Figure 2, Figure 4 is a fragmentary top plan view, on an enlarged scale, of a portion of the device, and Figure 5 is a transverse vertical sectional view taken substantially along the plane of the line 5—5 of Figure 1.

Referring more particularly to the drawings, wherein like reference characters designate like or corresponding parts throughout the different views, 10 designates generally an elongated carrier which, in the form of the invention as illustrated, is disclosed as a sled or drag and which includes an elongated substantially flat bottom or platform 11 having an upturned forward end 12. Elongated strips 13, which are angular in cross-section, are connected to the longitudinal edges of the bottom 11, as best seen in Figure 5, and include sides 14 which are suitably fastened to the underside of the bottom 11, and upset sides 15, which project upwardly from the longitudinal edges of the bottom 11. The sides 14 are curved upwardly at their forward ends as seen in 16 in Figure 1, to conform to the curvature of the upturned end 12. A substantially V-shaped hitch or coupling 17 projects from the forward end of the sled 10 and is provided with inturned terminals 18 which turnably engage openings 19 in the sides or flanges 15. The legs of the V-shaped coupling or hitch 17 are braced adjacent to the apex of the angle formed by said legs by means of a brace 20. The sled 10 is provided with longitudinally extending side rails 21 which are provided with downturned ends 22 and 23, which are suitably secured to the outer sides of the flanges 15 and adjacent the ends thereof. The downturned, rear ends 23 are preferably longer than the downturned forward ends 22 so that the rails 21 slope upwardly toward their rear ends. Rails 21 may be formed from rods or pipes of any desired diameter sufficient to efficiently perform the function for which the rails are intended, as will hereafter be described.

A sleeve, designated generally 24, is slidably mounted on each of the rails 21. The sleeves 24 are each divided lengthwise into corresponding flanged sections 25 which are detachedly connected together by means of fastenings 26 which extend through the flanges of the sections 25, for detachedly mounting the sleeves 24 on the rails 21. Posts 27 project upwardly from each of the upper sleeve sections 25 and said posts are each provided with a detachable portion 28 attached by means of a fastening 29. Posts 27 are provided with sockets 30 in their upper ends, portions of which sockets are formed by the detachable sections 28, as best seen in Figure 3. A ball 31 is removably and turnably mounted in each of the sockets 30. Balls 31 are provided with upwardly extending restricted shanks 32 to the upper ends of which are connected bearing sleeves 33, which are disposed at right angles to shanks 32. A rod or shaft 34 is disposed transversely of the sled 10 and is journaled near its ends in the bearing sleeves 33. A spike 35 is fixedly secured to each of the outer ends of the rod 34 and beyond the outer ends of a sleeve 33. Spikes 35 are angular in cross section and the sides thereof are tapered at the free ends of the spikes 35 to form pointed penetrating ends 36. A plate 37 is fastened to and projects outwardly from each of the spikes 35, near its free ends. Plates 37 are disposed obliquely to the longitudinal axes of the spikes 35.

A rod 38 is secured at one end thereof in any suitable manner around the intermediate portion of the shaft 34 and is provided with an angularly disposed free end 39 forming a hook. An eye 40 projects inwardly and upwardly from the upturned portion 12 to receive the hook end 39 of rod 38.

The coupling or hitch 17 is adapted to be connected to the rear end of a pickup hay press or baler of conventional construction, not shown, so that the sled 10 can be drawn through the field by the baler and will be in position to receive the baled hay which is discharged from the baler. This baled hay, not shown, is loaded onto the bottom 11. The spikes 35 are normally disposed, as seen in Figure 1, to extend downwardly and rearwardly and when thus disposed, the rod 38 is positioned so that its hook 39 engages the eye 40 to hold the rod 34 and parts connected thereto at the forward end of the sled 10, and when thus disposed, the pointed ends 36 drag along the ground when the sled 10 is drawn forwardly, and baled hay is loaded from the baler on the bottom 11, behind the shaft 34. When it is desired to unload the bales, the spikes 35 are swung in a counterclockwise direction, as seen in Figures 1 and 3, from their positions of Figure 1 to their positions of Figure 3. In their last mentioned positions, as seen in Figure 3, spikes 35 extend forwardly and downwardly with their pointed ends 36 engaging the surface over which the sled 10 is moving. This movement of the spikes 35 rotates the shaft 34 to swing the rod 38 from its full line to its dotted line position of Figure 1 to disengage hook 39 from the eye 40. When the sled 10 is now drawn forwardly, ends 36 will penetrate the earth to prevent the shaft 34 from moving forwardly and as a result the sleeves 24 will slide toward the rear end of rails 21 and permit shaft 34 to move toward the rear end of sled 10. In so moving, shaft 34 will engage the bales of hay and push them off of the rear end of the sled 10 by holding the bales stationary while the sled 10 is withdrawn from beneath the bales. If the earth is soft ends 36 can sink in up to the plates 37 which will then be positioned flat against the earth. Plates 37 will thus form abutments to limit the depth to which spikes 35 penetrate. After the bales of hay have been unloaded, the parts will be returned to their positions of Figure 1.

Obviously, the invention may be made in various sizes and various other modifications and changes are contemplated and may be resorted to, provided they fall within the spirit and scope of the invention as hereinafter defined by the appended claims, as only a preferred embodiment of the invention has been disclosed.

I claim as my invention:

1. A carrier unloader comprising a carrier having longitudinally extending side rails, a member mounted transversely of the carrier and slidably connected to the side rails for movement longitudinally of the carrier, said member being normally disposed adjacent an end of the carrier and arranged to move therewith, and means for holding said member so that the carrier can be moved relatively thereto so that the member will engage the load mounted on the carrier to push the load off of an end of the carrier.

2. An unloader as in claim 1, said means comprising spikes which are connected to the ends of said member and which are disposed exteriorly of the carrier for movement into positions to engage the surface on which the carrier is disposed, for holding the member so that the carrier can be moved relatively thereto.

3. An unloader as in claim 1, and means for detachably connecting the member to the carrier to hold it against movement relatively thereto.

4. A carrier unloader as in claim 1, said means being movable into a position to engage the surface on which the carrier is disposed for holding said member while the carrier is moved relatively thereto, and a hook connected to said member for detachably engaging the carrier to hold the member against movement relatively to the carrier and to retain said means out of engagement with the surface and in an inoperative position.

5. A carrier unloader comprising a sled or drag having an open rear end, said drag having side rails, posts slidably connected to the rails, a rod disposed transversely of the drag and connected to the posts, and means for holding the rod so that when the drag is moved the posts will slide on the rails for moving the rod toward the rear end of the drag to cause the rod to engage and push the load, carried by the drag, off of the rear end thereof.

6. An unloader as in claim 5, said means comprising spikes keyed to the ends of the rod and disposed beyond the sides of the drag, said spikes being swingable into positions to engage the surface on which the drag is disposed to anchor the rod thereto.

7. An unloader as in claim 5, and means for detachably connecting the rod to the forward end of the drag for holding it against movement relatively thereto and for holding said means in an inoperative position.

NOAH L. HAGAN.